(12) United States Patent
Kahle et al.

(10) Patent No.: US 9,687,950 B2
(45) Date of Patent: Jun. 27, 2017

(54) SYSTEM AND METHOD FOR POSITIONING A TOOL IN A WORK SPACE

(71) Applicant: Trimble Navigation Limited, Sunnyvale, CA (US)

(72) Inventors: Kent Wayne Kahle, Hayward, CA (US); Young Jin Lee, Columbus, OH (US)

(73) Assignee: Trimble Inc., Sunnyvale, CA (US)

( * ) Notice: Subject to any disclaimer, the term of this patent is extended or adjusted under 35 U.S.C. 154(b) by 491 days.

(21) Appl. No.: 13/800,350

(22) Filed: Mar. 13, 2013

(65) Prior Publication Data

US 2014/0267685 A1  Sep. 18, 2014

(51) Int. Cl.
| | |
|---|---|
| *B23Q 17/24* | (2006.01) |
| *B23Q 17/22* | (2006.01) |
| *H04N 7/18* | (2006.01) |
| *G01C 15/00* | (2006.01) |

(52) U.S. Cl.
CPC ............ *B23Q 17/24* (2013.01); *B23Q 17/22* (2013.01); *G01C 15/00* (2013.01); *H04N 7/181* (2013.01)

(58) Field of Classification Search
CPC  E02F 5/02; B23Q 17/24; B23Q 17/02; B23Q 17/2414; H04N 7/18; B25H 1/0092
See application file for complete search history.

(56) References Cited

U.S. PATENT DOCUMENTS

| | | | |
|---|---|---|---|
| 4,942,539 A | | 7/1990 | McGee et al. |
| 6,536,536 B1 * | | 3/2003 | Gass ..................... B23B 31/123 173/171 |
| 6,671,058 B1 | | 12/2003 | Braunecker et al. |
| 6,782,644 B2 | | 8/2004 | Fujishima et al. |
| 6,959,868 B2 | | 11/2005 | Tsikos et al. |
| 7,540,334 B2 | | 6/2009 | Gass et al. |
| 8,229,595 B2 | | 7/2012 | Seelinger et al. |
| 2003/0038179 A1 * | | 2/2003 | Tsikos ..................... G02B 26/10 235/454 |
| 2003/0147727 A1 * | | 8/2003 | Fujishima ............... E02F 3/435 414/200 |
| 2008/0047170 A1 * | | 2/2008 | Nichols ................... E02F 3/435 37/348 |

(Continued)

OTHER PUBLICATIONS

"PCT/US2014/025073 PCT Search Report and Written Opinion", Nov. 6, 2014, 18 Pages.

(Continued)

*Primary Examiner* — Jay Au Patel
*Assistant Examiner* — Marnie Matt
(74) *Attorney, Agent, or Firm* — Kilpatrick Townsend & Stockton LLP (57) ABSTRACT

A system for assisting an operator in positioning an operating element of any of a plurality of tools at a desired location at a worksite, includes a plurality of fixed position video imaging devices located at known positions at the worksite. Each of the imaging devices has a known field of view. A memory stores a digital image and dimensions of each of the tools, as well as the desired locations at the worksite for operating the tools. A processor is responsive to the video devices for determining the tool being viewed, and determining the position and orientation of the tool and the operating element of said tool. A radio transmitter transmits this to a receiver with the tool operator.

10 Claims, 6 Drawing Sheets

(56) References Cited

U.S. PATENT DOCUMENTS

| | | | |
|---|---|---|---|
| 2008/0196912 A1* | 8/2008 | Gass | B23B 31/123 |
| | | | 173/4 |
| 2010/0046791 A1* | 2/2010 | Glickman | G06K 9/209 |
| | | | 382/100 |
| 2010/0066676 A1* | 3/2010 | Kramer | G06F 3/017 |
| | | | 345/158 |
| 2010/0234993 A1* | 9/2010 | Seelinger | B25J 9/1697 |
| | | | 700/254 |
| 2012/0136475 A1* | 5/2012 | Kahle | G01S 5/0221 |
| | | | 700/182 |
| 2013/0137079 A1 | 5/2013 | Kahle et al. | |
| 2013/0250117 A1* | 9/2013 | Pixley | H04N 7/181 |
| | | | 348/156 |

OTHER PUBLICATIONS

Gong, et al., "An Object Recognition, Tracking and Contextual Reasoning-based Video Interpretation Method for Rapid Productivity Analysis of Construction Operations", Automation in Construction, Elsevier Science Publishers, Amsterdam, NL., May 9, 2011, 1121-1226.

3D reconstruction from multiple images, http://en.wikipedia.org/wiki/3D_reconsruction_from_multiple_images, printed Oct. 8, 2012, pp. 1-6.

Photogrammetry, http://en.wikipedia.org/wiki/Photogrammetry, printed Oct. 9, 2012, pp. 1-3.

* cited by examiner

SYSTEM AND METHOD FOR POSITIONING A TOOL IN A WORK SPACE

CROSS-REFERENCE TO RELATED APPLICATION

Not applicable.

STATEMENT REGARDING FEDERALLY SPONSORED RESEARCH OR DEVELOPMENT

Not applicable.

BACKGROUND

This relates to a system that facilitates positioning a tool in a work space or at a worksite, such as for example a construction site. When the interior of a building is being finished, connectors, anchors and the like are attached to the floors, ceilings and other structures in the building and cuts are made and holes drilled using power saws and drills. All of this must be accomplished using special power tools at predetermined locations, requiring that the tools be operated at numerous precisely defined positions in the building. For example, nail guns, power saws, powder anchor tools, and the like are used to nail, cut, install fasteners, and perform other operations at predetermined points within the building with little error. In any building, a large number of electrical, plumbing, and HVAC components must be properly sited and installed, usually with power tools. Additionally, finishing a building interior also requires that a number of different tools that are not powered be operated at precisely defined positions, such as for example reinforcement bar scanners. Positioning both power tools and non-power tools must be accomplished quickly and with some precision with respect to the surrounding walls, ceilings and floors as they are roughed in. Typically, it has required a significant amount of labor to lay out various construction points at such a construction site. Teams of workers have been needed to measure and mark predetermined locations. It will be appreciated that this process has been subject to errors, resulting from measurement mistakes and from accumulated errors. Further, the cost of this layout process and the time needed to perform the layout process have both been significant.

Various location determining systems, including systems that incorporate one or more robotic total stations, have been used for building layout. The total station in such a system, positioned at a fixed, known location, directs a beam of laser light at a retroreflective target. As the target moves, robotics in the total station cause the beam of light to track the target. By measuring the time of travel of the beam from the total station to the retroreflective target and then back to the total station, the distance to the target is determined. The directional orientation of the beam to the target is also measured. Since the dimensional coordinates of the total station are known, the dimensional coordinates of the retroreflective target can easily be determined. Based on the measured position of the retroreflective target, and the desired position of some building feature, such as a drilled hole, or a fastener, the operator can move the reflector to the desired position, and mark the position.

Although position determination systems, such as ranging radio systems and robotic total station systems, can facilitate and speed the layout process, nevertheless the layout process has continued to be lengthy, tedious, and expensive.

SUMMARY

A system for assisting an operator in positioning an operating element of any of a plurality of tools at a desired location at a worksite includes a plurality of fixed position video imaging devices located at known positions at the worksite. Each of the imaging devices has a known field of view. The tool has an operating element. A processor is responsive to the plurality of fixed position video imaging devices for determining the tool being viewed, and the position and orientation of the tool and the operating element of the tool. A radio transmitter is responsive to the processor for transmitting the position and orientation of the tool and the operating element and the desired position and orientation of the tool and the operating element to a receiver with the tool operator. A radio receiver and a display, responsive to the radio receiver, are carried by the tool operator, such that the operator is assisted in moving the operating element and the tool to a desired position. A memory may have a database of the digital image and dimensions of each of the plurality of tools, and a database of the desired locations at the worksite for operating the tool. A moveable video imaging device may also be used.

A method of assisting in the use by an operator of the operating element comprises the steps of providing a tool at the worksite, providing a plurality of video imaging devices at known positions with known fields of view in the work space, at least two of the video imaging devices providing an image of the tool at the worksite, and providing a database specifying the image and dimensions of the tool, including the operating element. The location and orientation of the tool are then determined based on the images of the tool from the at least two video imaging devices.

The method of assisting an operator in the use of the operating element of a tool at desired locations at a worksite may further include the steps of identifying a desired location at the worksite at which the tool is to be used, and displaying to the operator of the tool the position and orientation of the tool and the desired location at the worksite.

DETAILED DESCRIPTION

Figure 1:
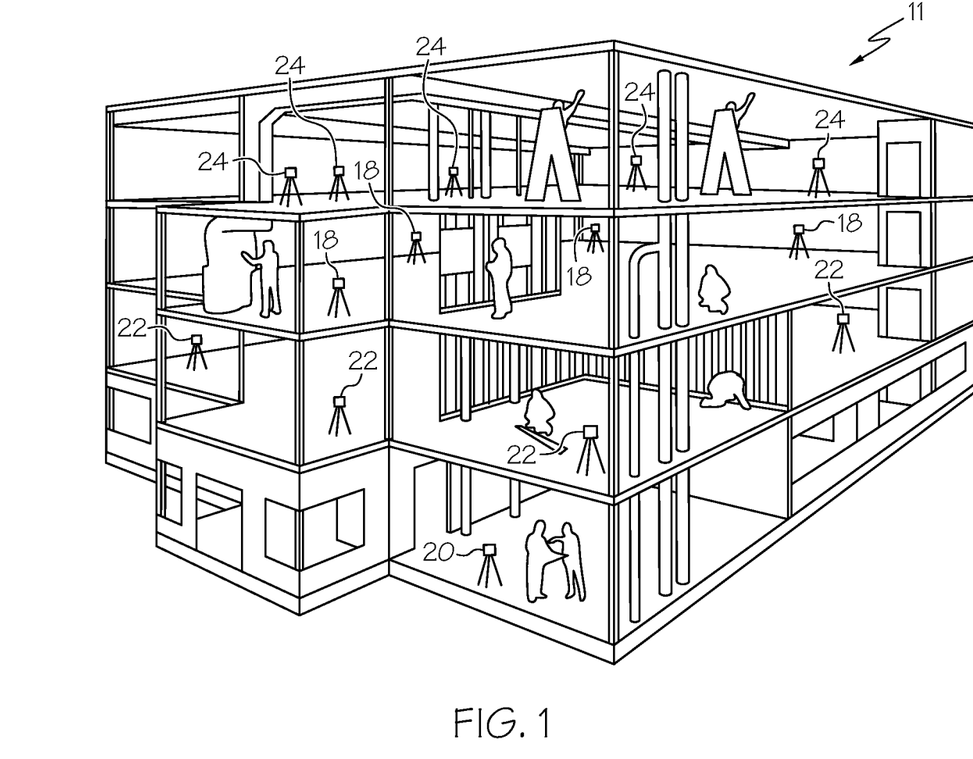
FIG. 1 is a view illustrating a building under construction.

FIG. 1 shows a building 11 under construction, a typical environment in which a system for assisting a tool operator in properly positioning the tool is needed, and an environment in which such a system can provide significant gains in productivity. Power tools are used to install fasteners, nails, and similar devices, and to cut holes and larger openings in various structural components, such as the floors, walls, and ceilings of the building. Non-power tools are also used to perform numerous functions. In the past it has been necessary for workers to go through a time-consuming layout process, measuring and marking points where various tools, such as power tools, are to be operated, before the cutting, fastening and steps are performed. The embodiments described, below, eliminate this measuring and marking process so that a tool can simply be moved directly to the location where it is to be used, and the operator can be signaled that the tool is properly located and oriented for operation or use.

Figure 2:
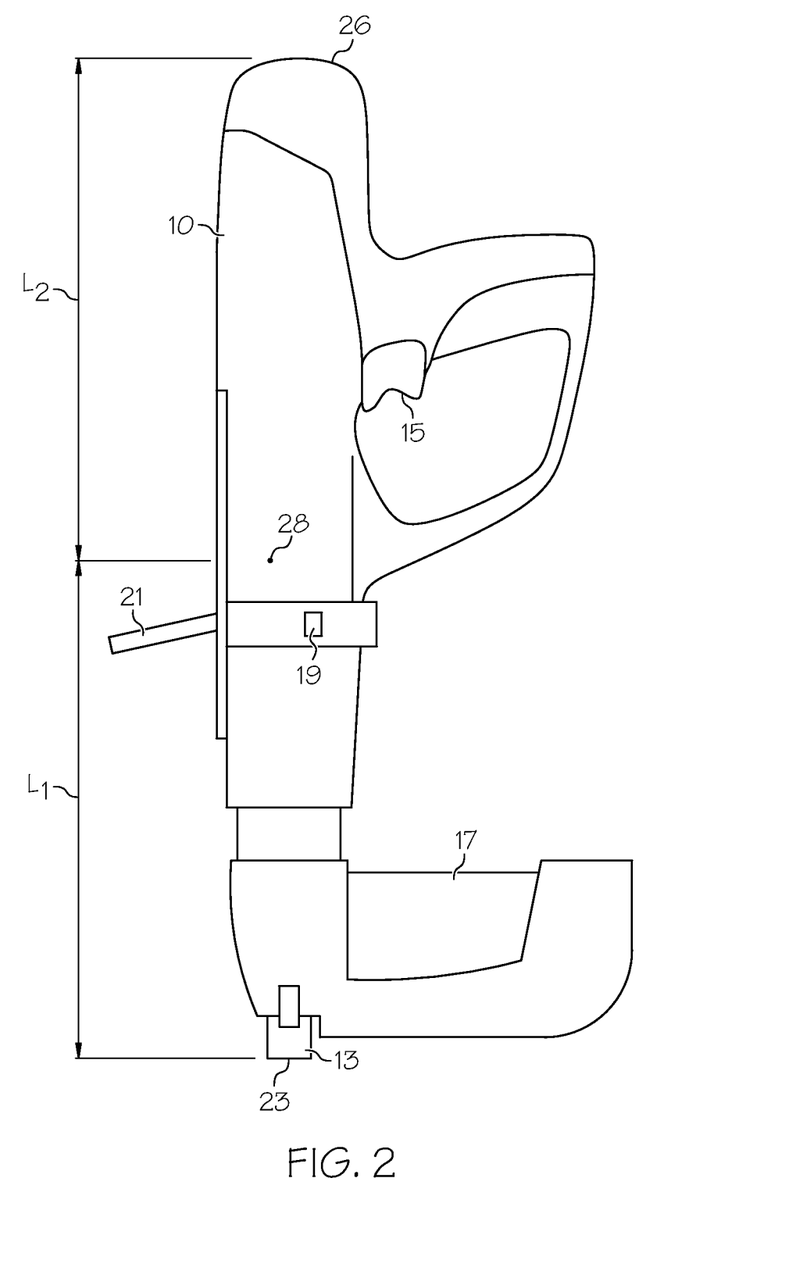
FIG. 2 shows a power tool.

Reference is made to FIGS. 1-4 which collectively illustrate a system for assisting an operator in using a tool at desired locations at a worksite without the need to measure the worksite and mark appropriate layout information on the floors, ceilings, and walls. It should also be appreciated that the tool may comprise a marking rod that permits the worker to make marks on surfaces with a marking element, such that later operations can be properly positioned. Such a marking rod may be particularly useful when the tool needed for the desired operation is not immediately available for use. The system includes a tool 10, which is shown in FIG. 2 as a power fastener tool. As discussed, below, the system may include and operate with a number of different power tools, recognizing and differentiating among them. It will be appreciated that the system may be used with non-power tools, as well. The tool 10 has an operating element, a barrel 13, from which a fastener is fired when the operator presses trigger 15. A supply of fasteners is provided in canister 17. The system includes a position radio receiver 19 that is mounted on the tool 10 for receiving information specifying the position and orientation of the tool such that this information can be displayed on display 21 for review by the operator. Based on the displayed information, the operator can position the barrel 13 properly and orient the tool 10 properly before the tool is actuated. This will result in a fastener being secured to a surface at the worksite at a desired location without the need for preliminary layout and marking at the worksite.

Figure 3:
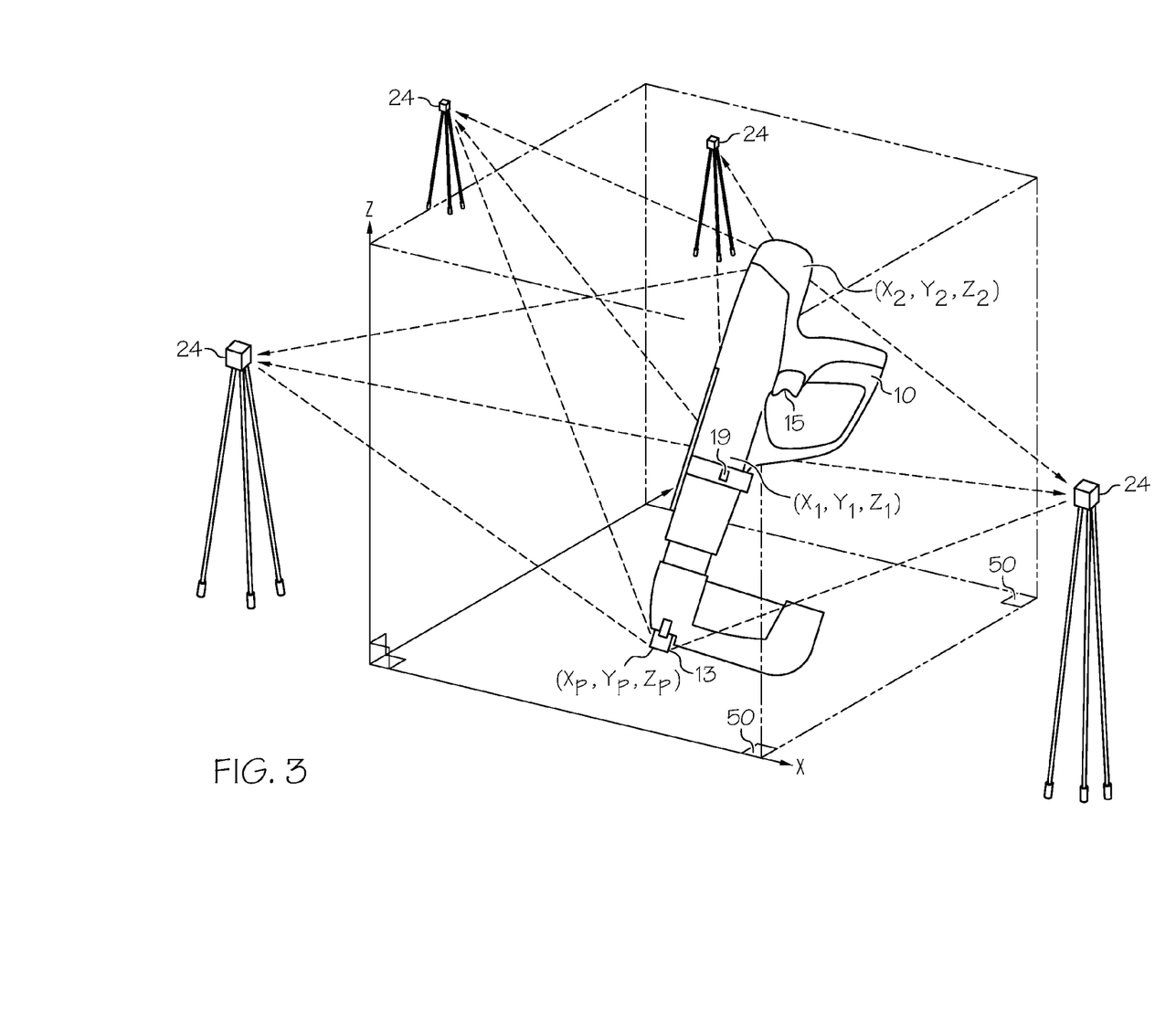
FIG. 3 illustrates the manner in which fixed position video imaging devices are used to determine the dimensional co-ordinates of a point adjacent the operating element of the power tool.

The system for assisting an operator in positioning an operating element of a tool includes a plurality of fixed position video imaging devices, shown as digital video imaging devices 18, 20, 22, and 24. Each of the imaging devices has been leveled, is located at a known position at the worksite 11, and faces in a known direction. As a consequence, each of the imaging devices has a known field of view. As shown in FIG. 1, there are a number of digital video imaging devices positioned on each floor with the imaging devices arranged to afford the system a view of substantially the entire floor under construction. Digital video imaging devices 18 are positioned on the third floor of the building 11, digital video imaging devices 20 are positioned on the first floor of the building 11, digital video imaging devices 22 are positioned on the second floor of the building 11, and digital video imaging devices 24 are positioned on the fourth floor of the building 11. FIG. 3 shows a tool 10 located on the fourth floor of the building 11, being viewed by four separate video imaging devices 24. The devices 24 are oriented, either manually or automatically. Devices 24 face in known directions, and their fields of view are therefore known. Each of the video imaging devices 24 has the tool 10 and the operating element 13 of tool 10 in its field of view in FIG. 3. It will be appreciated, however, that not all of the devices may be able to see a tool as it is moved to various parts of the building floor. The center of the operating element 13 in the image produced by each device 24 defines a vector from that device to the operating element. Since the locations of the devices 24 are precisely known, the vectors from the devices collectively provide the location $(X_p, Y_p, Z_p)$ of the operating element of the tool. Although two such vectors are all that are needed to specify this location, additional vectors provided by additional devices enhance the accuracy of the system. Also having a larger number of video devices makes it more likely that at least two devices will always have a view of the operating element 13 as the operator moves about the worksite with the tool. The orientation of the tool 10 is determined by locating a point 26 $(X_2, Y_2, Z_2)$ at the opposite end of the tool 10. If the operating element 13 is not visible to the devices 24 because of the particular location at the worksite where the tool is being used, the location of the operating element 13 may be determined by locating another point on the tool, such as point 28 half way along the length of the tool 10.

As shown in FIG. 3, the coordinates of point 28 are $X_1$, $Y_1$, and $Z_1$, the coordinates of point 26 are $X_2$, $Y_2$, and $Z_2$, and the coordinates of point 23 are $X_P$, $Y_P$, and $Z_P$. Points 26 and 28 lie on a common line with point 23. It will be apparent from a review of FIG. 3, that $$(X_2-X_1)/L_2=(X_1-X_P)/L_1 \text{ and}$$

$$X_P=X_1+(L_1/L_2)(X_1-X_2).$$

Similarly, $$Y_P=Y_1+(L_1/L_2)(Y_1-Y_2), \text{ and}$$

$$Z_P=Z_1+(L_1/L_2)(Z_1-Z_2).$$

If $L_1=L_2$, then these relationships simplify even further to $$X_P=2X_1-X_2,$$

$$Y_P=2Y_1-Y_2, \text{ and}$$

$$Z_P=2Z_1-Z_2.$$

Thus, if the three-dimensional coordinates of the points 26 and 28 are determined, the three-dimensional coordinates of the point 23 is also known.

The coordinates of points 23, 26 and 28 are determined by use of the vector information provided by the video devices 24. The system further includes a processor 40 (FIG. 4) which is responsive to the digital video imaging devices 24 that provide vector information. Processor 40, which is connected to the video imaging devices 18, 20, 22 and 24 by a wired connection or by a wireless link, determines the position of each of the points 23, 26, and 28 with respect to the devices 24 using triangulation analysis based on the vectors from the video devices 24.

Figure 4:
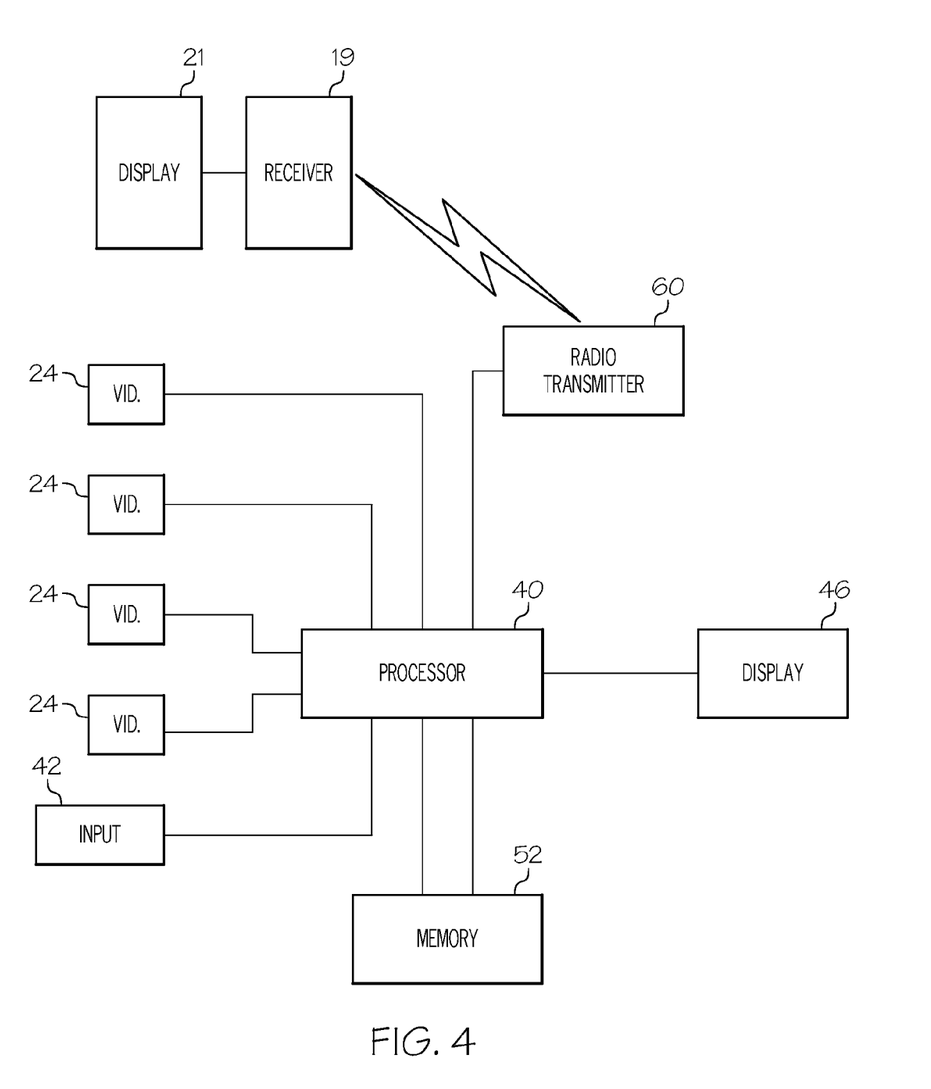
FIG. 4 is a schematic diagram of circuitry used in the system.

The processor 40 may receive the coordinates of each of the video devices 24 through a manual input at 42, or by any other appropriate means. Alternatively, the system may initially determine these coordinates based on the vectors from the devices 42 to targets 50. Targets 50 are positioned at known locations at the worksite and permit each of the video devices 24 to be deployed with a minimum of effort.

In any event, the position of point 23 is determined either by direct observation by devices 24 or in relation to points 26 and 28, and compared with data stored in memory 52. Memory 52 has data stored specifying a building information model (BIM) for the building 11. The memory 52 further has data specifying one or more desired locations for operation of the tool at the worksite. The memory 52 also has data stored specifying the appearance and dimensions of the tool 10, as well as other tools that may be used at the worksite. The processor 40 determines the location and orientation of the tool 10 in response to the images of the tool 10 provided by the plurality of video imaging devices 24 and compares this with a desired point of operation and tool orientation. Additionally, the processor may automatically determine which of the various tools that may be used at the worksite is then in the field of view of the video devices 24. This information is displayed on a display 46, as well as supplied to a radio transmitter 60 for transmission to the tool operator. The information is received by receiver 19 and then displayed on display 21 so that the operator may move the tool to the desired location at the worksite for operation.

The video devices 24 are shown in FIG. 4 as being directly connected to the processor 40, but may alternatively be connected via a radio link, or other wireless link to the processor 40. As stated above, the memory 52 may have a database of the digital image and dimensions of each of the plurality of tools, and a database specifying the desired locations at the worksite for operating each of these tools. The processor is capable of determining which of the tools is then in the view of the video devices, and of keeping track of more than one such tool simultaneously.

In use, the video devices 24 are positioned at the worksite, leveled manually or automatically, and their three-dimensional coordinates noted either manually or automatically by reference to precisely located targets. The tool 10 is then moved by the operator so that the operating element of the tool is at a desired location, as indicated on display 21. The tool is then operated, and the tool moved to the next point of operation. When the tool is properly positioned and operated, a switch associated with trigger 15 may be actuated, permitting the system to keep track of the desired locations where the tool has been operated.

Figure 5:
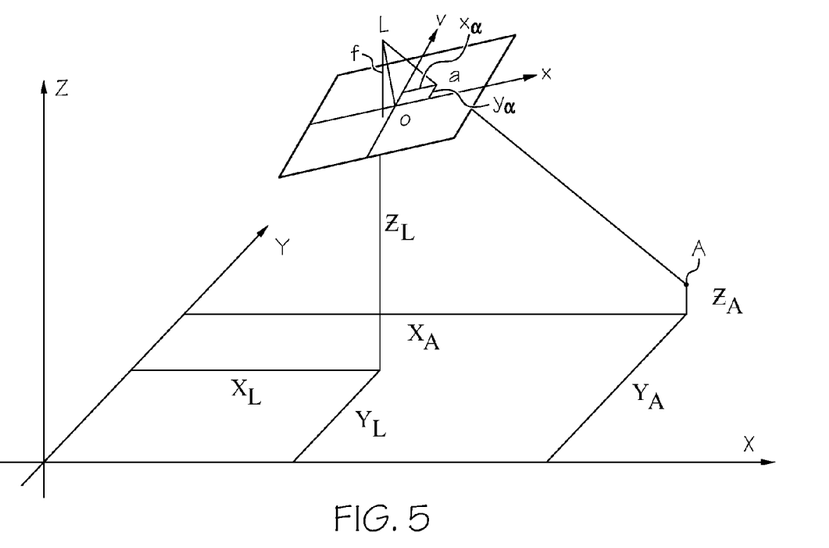
FIGS. 5 and 6 are useful in explaining the manner in which video imaging devices may be used to determine the position of a point in space.
Figure 6:
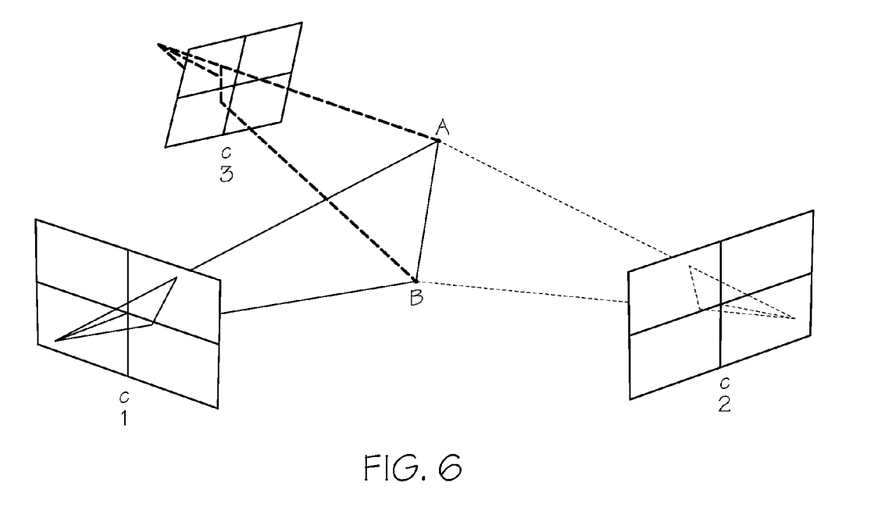

Reference is now made to FIGS. 5 and 6, which illustrate the manner in which video imaging devices may be used to determine the position of a point in space, such as for example the operating element or other point on a tool. Generalizing, and referring specifically to FIG. 5, it will be seen that collinearity equations represent the condition in which the exposure station of any photograph, an object point, and its photo image all lie on a straight line.

$$x_a = x_o - f\left[\frac{m_{11}(X_A - X_L) + m_{12}(Y_A - Y_L) + m_{13}(Z_A - Z_L)}{m_{31}(X_A - X_L) + m_{32}(Y_A - Y_L) + m_{33}(Z_A - Z_L)}\right]$$

$$y_a = y_o - f\left[\frac{m_{21}(X_A - X_L) + m_{22}(Y_A - Y_L) + m_{23}(Z_A - Z_L)}{m_{31}(X_A - X_L) + m_{32}(Y_A - Y_L) + m_{33}(Z_A - Z_L)}\right]$$

where, f is the camera focal length, $x_o$, $y_o$ are the image space coordinates of the principal point, $X_L$, $X_L$, $Z_L$, are object space coordinates of the exposure station (L), $X_A$, $Y_A$, $Z_A$ are the object space coordinates of the arbitrary point A, and $x_a$, $y_a$ are the image space coordinates of the point A. "m's" are the elements of the rotation matrix which can be calculated from three rotation angles ($\omega,\phi,\kappa$)

$$\begin{bmatrix} m_{11} & m_{12} & m_{13} \\ m_{21} & m_{22} & m_{23} \\ m_{31} & m_{32} & m_{33} \end{bmatrix} = \begin{bmatrix} \cos\kappa & \sin\kappa & 0 \\ -\sin\kappa & \cos\kappa & 0 \\ 0 & 0 & 1 \end{bmatrix} \begin{bmatrix} \cos\phi & 0 & -\sin\phi \\ 0 & 1 & 0 \\ \sin\phi & 0 & \cos\phi \end{bmatrix} \begin{bmatrix} 1 & 0 & 0 \\ 0 & \cos\omega & \sin\omega \\ 0 & -\sin\omega & \cos\omega \end{bmatrix}$$

The nonlinear collinearity equations are linearized by using Taylor's theorem. In linearizing them, the collinearity equations are rewritten as following:

$$F = x_o - f\frac{r}{q} = x_a$$

$$G = y_o - f\frac{s}{q} = y_a$$

where $$q = m_{31}(X_A - X_L) + m_{32}(Y_A - Y_L) + m_{33}(Z_A - Z_L)$$

$$r = m_{11}(X_A - X_L) + m_{12}(Y_A - Y_L) + m_{13}(Z_A - Z_L)$$

$$s = m_{21}(X_A - X_L) + m_{22}(Y_A - Y_L) + m_{23}(Z_A - Z_L)$$

According to Taylor's theorem, the collinearity equation may be expressed in linearized form by taking partial derivatives with respect to the unknowns. In this case, the unknowns are the object coordinates of the arbitrary point A. The followings equations are simplified forms of the linearized collinearity equation to estimate the object coordinates of the arbitrary point A.

$$b_{14}dX_A + b_{15}dY_A + b_{16}dZ_A = J + v_{x_a}$$

$$b_{24}dX_A + b_{25}dY_A + b_{26}dZ_A = K + v_{y_a}$$

where, $$b_{14} = \frac{f}{q^2}(rm_{31} - qm_{11})$$

$$b_{15} = \frac{f}{q^2}(rm_{32} - qm_{12})$$

$$b_{16} = \frac{f}{q^2}(rm_{33} - qm_{13})$$

$$b_{24} = \frac{f}{q^2}(sm_{31} - qm_{21})$$

$$b_{25} = \frac{f}{q^2}(sm_{32} - qm_{22})$$

$$b_{26} = \frac{f}{q^2}(sm_{33} - qm_{23})$$

Assume that there are three cameras, $C_1$, $C_2$, and $C_3$, with known interior and exterior orientation parameters. The unknowns are the object coordinates of two arbitrary points A and B. Then the matrix form of the above linearized collinearity equation is written as following.

$$AX = L + V$$
where $$A = \begin{bmatrix} (b_{A14})_{c1} & (b_{A15})_{c1} & (b_{A16})_{c1} & 0 & 0 & 0 \\ (b_{A24})_{c1} & (b_{A25})_{c1} & (b_{A26})_{c1} & 0 & 0 & 0 \\ (b_{A14})_{c2} & (b_{A15})_{c2} & (b_{A16})_{c2} & 0 & 0 & 0 \\ (b_{A24})_{c2} & (b_{A25})_{c2} & (b_{A26})_{c2} & 0 & 0 & 0 \\ (b_{A14})_{c3} & (b_{A15})_{c3} & (b_{A16})_{c3} & 0 & 0 & 0 \\ (b_{A24})_{c3} & (b_{A25})_{c3} & (b_{A26})_{c3} & 0 & 0 & 0 \\ 0 & 0 & 0 & (b_{B14})_{c1} & (b_{B15})_{c1} & (b_{B16})_{c1} \\ 0 & 0 & 0 & (b_{B24})_{c1} & (b_{B25})_{c1} & (b_{B26})_{c1} \\ 0 & 0 & 0 & (b_{B14})_{c2} & (b_{B15})_{c2} & (b_{B16})_{c2} \\ 0 & 0 & 0 & (b_{B24})_{c2} & (b_{B25})_{c2} & (b_{B26})_{c2} \\ 0 & 0 & 0 & (b_{B14})_{c3} & (b_{B15})_{c3} & (b_{B16})_{c3} \\ 0 & 0 & 0 & (b_{B24})_{c3} & (b_{B25})_{c3} & (b_{B26})_{c3} \end{bmatrix},$$

$$X = \begin{bmatrix} dX_A \\ dY_A \\ dZ_A \\ dX_B \\ dY_B \\ dZ_B \end{bmatrix}$$

$$L = \begin{bmatrix} (J_A)_{c1} \\ (K_A)_{c1} \\ (J_A)_{c2} \\ (K_A)_{c2} \\ (J_A)_{c3} \\ (K_A)_{c3} \\ (J_B)_{c1} \\ (K_B)_{c1} \\ (J_B)_{c2} \\ (K_B)_{c2} \\ (J_B)_{c3} \\ (K_B)_{c3} \end{bmatrix},$$

$$V = \begin{bmatrix} (v_{x_A})_{c1} \\ (v_{y_A})_{c1} \\ (v_{x_A})_{c2} \\ (v_{y_A})_{c2} \\ (v_{x_A})_{c3} \\ (v_{y_A})_{c3} \\ (v_{x_B})_{c1} \\ (v_{y_B})_{c1} \\ (v_{x_B})_{c2} \\ (v_{y_B})_{c2} \\ (v_{x_B})_{c3} \\ (v_{y_B})_{c3} \end{bmatrix}$$

The least squares solution of above equation can be acquired by the following equation $$X = (A^T A)^{-1} A^T L$$

The above equation provides three dimensional object space coordinates of arbitrary points A and B. Therefore, the three dimensional orientation of a vector between the two points can be directly determined.

Figure 7:
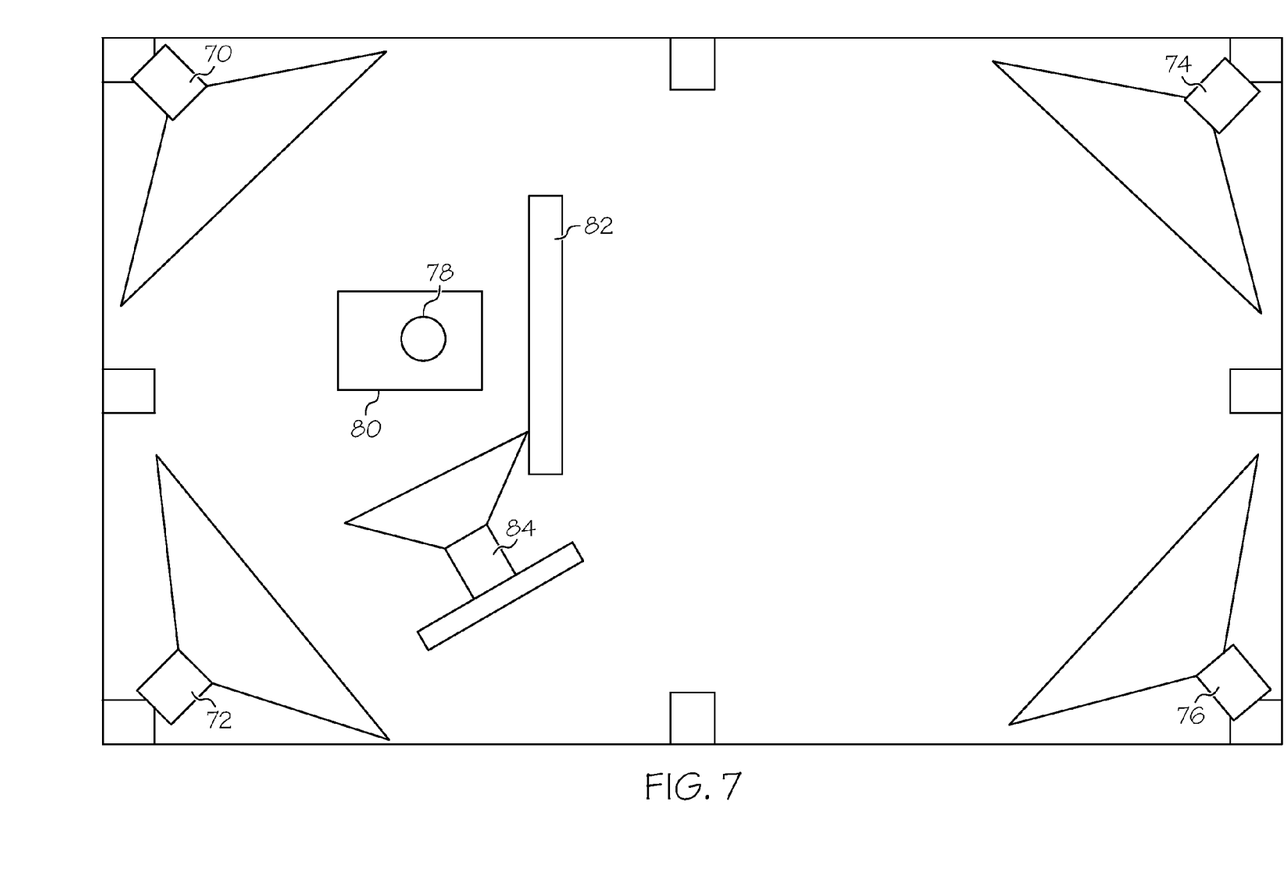
FIG. 7 is a diagrammatic plan view of the floor plan of a building showing fixed and moveable video imaging devices.

Reference is made to FIG. 7, which is a diagrammatic plan view of the floor plan of a building interior. Located in the building are four video imaging devices, 70, 72, 74, and 76, fixed in position in separate corners of the building. FIG. 7 presents the situation in which a worker 78 on a scissors lift 80 is working at a position adjacent a wall 82. Wall 82 screens the worker from video imaging devices 74 and 76, permitting the tool being used by the worker to be viewed only by video imaging devices 70 and 72. While, of course, the position of the tool carried by the worker may be determined from the video data developed by two video imaging devices, the accuracy of the calculated position improves with data from additional devices. Additionally, it is quite possible that the tool may be screened from the view of one of the devices 70 and 72 by the worker. In order to address these situations, a portable video imaging device 84 may be positioned appropriately. The video device 84 is located where all of the other video devices 70-76 may view it, permitting its location to be calculated accurately. With the location, orientation and field of view of the video device 84 determined, the video data from device 84 may be processed in conjunction with data from devices 70 and 72 to determine the location of a tool being used by worker 78. When worker 78 and lift 80 are moved to the other side of wall, 82, the video device 84 may be repositioned so that its output may be combined with video output from devices 74 and 76.

As discussed, above, the system memory 52 may includes data defining the digital image and dimensions of each of a plurality of tools, so that the system can distinguish among the various tools that may be used by a worker. The system may then determine location based on a recognition of the overall three dimensional image of the tool, or based on the certain features of the tool, whether those features were added to the tool for this specific purpose or built into the tool for this or another purpose.

The system is capable of finding and tracking various construction tools as they move about the building construction site. It will be appreciated that each video imaging device viewing the construction site will provide a huge amount of video data for analysis. This analysis task may be simplified by only looking at those portions of each digital image where movement is sensed. While tools will be stationary from time to time, when they are in use by a workman, much of the time they will be moving from point to point. Once a tool and its features are located, the system can then continue to monitor the position of the tool, even when the tool is stationary.

If desired, a system may be configured to determine the coordinates of a point of interest in two dimensional space. Such a two dimensional system may be used, for example, to lay out positions on the floor of a building for operation of tools. Only one video device need be used for two dimensional operation, although using additional video devices increases accuracy and reduces the risk that the tool will be moved to a location at the worksite where there is no coverage by a video device.

Other variations in the system depicted in FIGS. 1-7 may be adopted. For example, a video surveying system may be utilized in which each tool carries unique video targets. The targets allow the video surveying system to identify the tool, as well as its orientation.

Other arrangements can be used to determine the position and orientation of the tool.

What is claimed is:

1. A system for assisting an operator in carrying any of a plurality of tools to a desired position and a desired orientation at a worksite, said system comprising:
   a plurality of imaging devices located at known positions at said worksite, each of said imaging devices having a known field of view,
   a tool having an operating element, said tool being one of said plurality of tools and wherein said tool is configured to be directly and physically manipulated by said operator,
   a memory having a database stored therein of the digital image and dimensions of each of said plurality of tools,
   a processor, responsive to said plurality of imaging devices, wherein:
      said plurality of imaging devices are configured to view said tool,
      said processor is configured to identify said tool from said plurality of tools, and
      said processor is configured to determine a current position of said tool, a current orientation of said tool, said desired position of said tool, and said desired orientation of said tool, and
   a display attached to said tool, where said display is configured to display visual information such that said operator is assisted in directly and physically carrying said tool from said current position and said current orientation to said desired position and said desired orientation.

2. A system for assisting an operator in carrying a tool to a desired position and a desired orientation at a worksite, said system comprising:
   a plurality of video imaging devices located at known locations at said worksite, each of said video imaging devices having a known field of view,
   a processor, responsive to said plurality of video imaging devices, said processor including a memory having data stored therein specifying a desired position and a desired orientation of said tool at said worksite, said memory further having data stored therein specifying the appearance and dimensions of said tool, said processor configured to identify said tool and to determine a current position of said tool and a current orientation of said tool, and
   a display for providing indications to said operator of said tool such that said operator is assisted in directly and physically carrying said tool from said current position and said current orientation to said desired position and said desired orientation.

3. The system of claim 2, wherein said memory includes data specifying the appearance and dimensions of a plurality of tools, and in which said processor determines which of said plurality of tools is in the field of view of said video imaging devices.

4. The system of claim 2, wherein said processor determines a position of an operating element of said tool and a movement of said operating element needed to move said operating element to a desired location.

5. The system of claim 4, wherein said desired locations is specified in three dimensions.

6. The system of claim 4, wherein said desired locations is specified in two dimensions.

7. A method of assisting an operator in carrying a tool to a desired position and a desired orientation at a worksite, said method comprising the steps of:
   providing a tool at said worksite, wherein said tool is configured to be directly and physically manipulated by said operator,
   providing a plurality of imaging devices at known positions with known fields of view in the worksite, at least two of said plurality of imaging devices providing an image of the tool at said worksite,
   providing a database specifying the image and dimensions of said tool, including an operating element of said tool,
   determining a current position of said tool, a current orientation of said tool, said desired position of said tool, and said desired orientation of said tool, and
   displaying, at a display attached to said tool, visual information such that said operator is assisted in directly and physically carrying said tool from said current position and said current orientation to said desired position and said desired orientation.

8. The method of claim 7, further comprising the steps of:
   identifying a desired location at said worksite at which said tool is to be used, and displaying to said operator said desired location.

9. A system for guiding an operator of a tool in moving an operating element of said tool to a desired location in a workspace, said system comprising:
   a plurality of fixed imaging devices at known positions with known fields of view in said workspace,
   a moveable imaging device, positionable in said workspace,
   a processor, responsive to said plurality of fixed imaging devices and to said moveable imaging device, wherein:
      said plurality of fixed imaging devices and said moveable imaging device are configured to view said tool,
      said processor is configured to identify said tool, and
      said processor is configured to determine a current position of said tool, a current orientation of said tool, a desired position of said tool, and a desired orientation of said tool, and
   a display for providing indications to said operator of said tool such that said operator is assisted in directly and physically carrying said tool from said current position and said current orientation to said desired position and said desired orientation.

10. The system of claim 9, wherein said plurality of imaging devices comprises at least four imaging devices.

* * * * *